United States Patent [19]
Lee et al.

[11] 4,412,744
[45] Nov. 1, 1983

[54] ABSOLUTE SPECTROPHOTOMETER

[75] Inventors: Jerald D. Lee, Mendenhall, Pa.; Charles D. Reilly, Wilmington, Del.

[73] Assignee: E. I. Du Pont de Nemours & Co., Wilmington, Del.

[21] Appl. No.: 268,707

[22] Filed: Jun. 1, 1981

[51] Int. Cl.³ .............................................. G01J 3/42
[52] U.S. Cl. ..................................... 356/319; 250/205
[58] Field of Search ................ 356/319, 321, 323–325, 356/326, 328; 250/205

[56] References Cited

U.S. PATENT DOCUMENTS

| | | |
|---|---|---|
| 3,245,305 | 4/1966 | Turner . |
| 3,431,054 | 3/1969 | Doonan et al. ...................... 356/109 |
| 3,506,358 | 4/1970 | Baba et al. ............................. 356/86 |
| 3,561,872 | 2/1971 | Grabowski et al. ............. 356/319 X |
| 3,646,331 | 2/1972 | Lord ................................. 235/151.3 |
| 3,806,258 | 4/1974 | Rich ..................................... 356/226 |
| 3,874,799 | 4/1975 | Isaacs et al. ......................... 356/173 |
| 4,093,991 | 6/1978 | Christie et al. ..................... 364/525 |
| 4,176,957 | 12/1979 | Maeda et al. ....................... 356/319 |
| 4,227,811 | 10/1980 | Tohyama et al. ................... 356/325 |

OTHER PUBLICATIONS

Defreese et al., *Analytical Chemistry*, vol. 48, No. 11, Sep. 1976, pp. 1530–1536.

*Primary Examiner*—F. L. Evans
*Attorney, Agent, or Firm*—Hilmar L. Fricke

[57] ABSTRACT

An improved spectrophotometer having a light source, a scanning type monochromator that provides light beams of different wavelengths over a light spectrum being scanned, and an object photometer for measuring the intensity of reflected light from an object being tested and generating an electrical signal proportional to the intensity of the light measured and connected to means for recording the signal as a function of wavelength measured, the improvement used therewith comprising:

(a) a beam splitter that divides the beam exiting from the monochromator into first and second light beams, whereby the first beam is incident upon the object;

(b) a reference photometer that measures the flux of the second light beam and generates an output electrical signal proportional to the intensity of the light measured; and (c) a light source control, connecting the reference photometer and the light source, which receives the electrical signal from the reference photometer and generates a feedback electrical signal to adjust the intensity of the light source to maintain the reference photometer output electrical signal level constant across the light spectrum that is being scanned.

The spectrophotometer is useful for determining standard color values for coatings on substrates or for any colored surface.

10 Claims, 5 Drawing Figures

ABSOLUTE SPECTROPHOTOMETER

BACKGROUND OF THE INVENTION

1. Field of the Invention

This invention is related to a spectrophotometer and in particular, to an improved spectrophotometer.

2. Description of the Prior Art

The following prior art shows spectrophotometers and other color measurement devices:

U.S. Pat. No. 3,245,305 issued Apr. 12, 1966 to Turner is directed to a spectrometric apparatus having two sources of radiation, two monochromators and two detectors which compare the intensities of the two sources of radiation and adjusts the intensity of one of the sources to maintain the intensity of the sources at a constant ratio.

U.S. Pat. No. 3,431,054 issued Mar. 4, 1969 to Doonan, et al. is directed to a scanning monochromator device that has a controlled output of radiant flux over the band of wavelengths to be scanned that is controlled according to an adjustable preset pattern that varies with wavelength.

U.S. Pat. No. 3,506,358 issued Apr. 14, 1980 to Hiroack Baba, et al. is directed to a rapid scanning spectrophotometer of a double beam mode in which a photoelectric detector is provided in each light path and the supply voltage is controlled so that the output of each detector is always at a constant level to provide for variations of intensity of light source used in the spectrophotometer.

U.S. Pat. No. 3,646,331 issued Feb. 29, 1972 to Lord is directed to a method and apparatus for correcting radiation measuring errors in a spectrophotometer. Correction factors for each discrete wavelength are stored in a computer and applied to the output of the apparatus when measurements are made.

U.S. Pat. No. 3,806,258 issued Apr. 23, 1974 to Rich is directed to an absorptiometer in which the lamp source output is maintained at a predetermined level and means are provided to maintain the output at this level while measurements are being made.

U.S. Pat. No. 4,093,991 issued June 6, 1978 to Christie, Jr., et al. is directed to a scanning spectrophotometer-digital data processing system which includes a microcomputer.

U.S. Pat. No. 4,176,957 issued Dec. 4, 1979 to Meada, et al. is directed toward a method for optically analyzing a specimen by an automatic wavelength scanning operation by using two light beams for determining the reflectance of a specimen by using a ratio of the intensities of the reference light and the specimen light at various wavelengths.

Thus prior art spectrophotometers that use a scanning type monochromator to produce an opticalelectrical signal give inaccurate results that vary with wavelength. This variation in signal is due to the emitted spectral distribution of the light source, the wavelength dependent diffraction efficiency of the monochromator and the spectral sensitivity of a photodetector. Other variations in signal level for example are caused by power line voltage variations, thermal expansion of the optical elements, blackening of the source, and when quartz-halogen lamps are used, repetitions of the halogen cycle.

The prior art spectrophotometers are not adequately equipped to compensate for the above variations in the output signals.

SUMMARY OF THE INVENTION

An improved spectrophotometer that has a light source, a scanning type monochromator that has an entrance slit and an exit slit for a light beam from the light source and contains a movable light dispersing element and a wavelength drive mechanism to provide light beams of different wavelengths over a light spectrum being scanned, beam-shaping optics at the exit slit of the monochromator and an object photometer for measuring the intensity of reflected or transmitted light from an object being tested and generating an electrical signal proportional to the intensity of the light measured and electrically connected to means for recording said electrical signal as a function of wavelength measured, the improvement that is used with this spectrophotometer comprises:

(a) a beam splitter that is positioned between the beam-shaping optics and said object that divides the beam exiting from the monochromator into first and second light beams, whereby the first beam is incident upon the object;

(b) a reference photometer that measures the flux of the second light beam and generates an output electrical signal proportional to the intensity of the light measured; and (c) a light source control that is connected to the reference photometer and the light source; the control receives the output electrical signal from the reference photometer and generates a feedback electrical signal that adjusts the intensity of the light source to maintain the reference photometer output electrical signal level constant across the light spectrum that is being scanned.

DETAILED DESCRIPTION OF THE INVENTION

Figure 1:
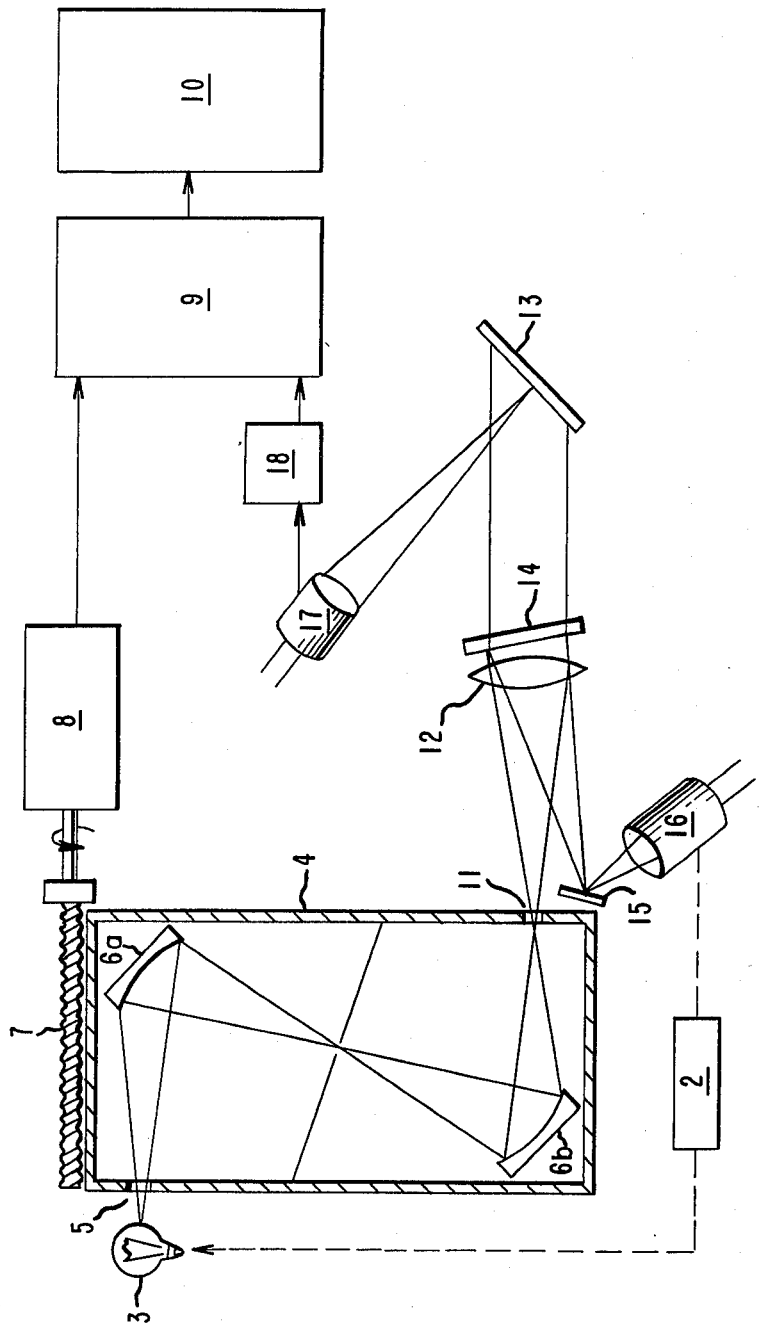
FIG. 1 is a simplified diagram of the apparatus.

FIG. 1 illustrates a simplified diagram of the apparatus of this invention. The components illustrated in the diagram are positioned in a metal housing with an opening for placement of samples of which the colors are to be measured. A computer having a digital display unit can be connected to the apparatus to provide a direct readout of quantities computed from spectral data such as standard tristimulus color values or color coordinate values of the sample.

A D.C. power supply is connected to a lamp control unit 2 which is connected to the lamp 3. The lamp typically is a FCS 24 volt 150 watt halogen cycle tungsten bulb. A light beam from the lamp passes into a scanning holographic double grating type monochromator 4 through an entrance slit 5. Other types of monochromators known in the art can be used. The gratings 6a and 6b are driven continuously by the wavelength drive unit 7 to scan the complete visible light spectrum. Shaft encoder 8 which is attached to wavelength drive unit 7 feeds an electrical signal into an internal processor unit 9. The output of the internal processor 9 is connected to a computer 10. For any given wavelength drive position, gratings 6a and 6b are oriented to image a corresponding spectral band from the scanned light spectrum between 385 to 705 nm (nanometers or meters $\times 10^{-9}$) onto the exit slit 11 of monochromator 4). A series of 320 measurements of the light spectrum at 1 nm intervals are taken in sequence in groups of ten each. These 32 groups are then processed by the internal processor unit 9. The light beam at the given spectral band exits the monochromator 4 through an exit slit 11 and through a collimating lens 12.

The collimated light beam is directed at a paint sample 13 or other colored sample being tested and is transmitted through beam splitter 14. Beam splitter 14 divides the light beam into two parts. One part of the light beam is directed at the sample 13 and the other part is directed to a mirror 15 which reflects the light beam to a reference photometer 16.

An electrical signal generated by the reference photometer 16, which is directly proportional to the intensity of the light beam, is fed into the lamp control 2. The lamp control 2 adjusts the electrical power supplied to the lamp 3 so as to vary the light beam intensity throughout the scan in such a way that the signal level (product of lamp intensity and system responsivity) measured by reference photometer 16 remains constant.

The light beam projected onto the sample 13 is reflected to object photometer 17 which in turn feeds an electrical signal generated by the light beam into the voltage/frequency (v/f) converter 18. Converter 18 generates pulses at a rate that is directly related to the level of the input signal. The signal output from the converter 18 is then fed to the data logic circuit of internal processor 9 which counts the pulses of the signal over preset time intervals (32 intervals) and converts the signal to a parallel format for processing by the computer 10. The computer calculates X, Y, Z tristimulus color values for the color derived from the reflectance data using the standard International Commission on Illumination system. The computer also calculates transformation of the color tristimulus values to obtain L, a, b uniform color space values.

With proper electrical modifications, it is possible to replace the internal processor 9 and the computer 10 with a microprocessor which performs the same functions as the internal processor and computer and calculates the aforementioned color values.

Figure 2:
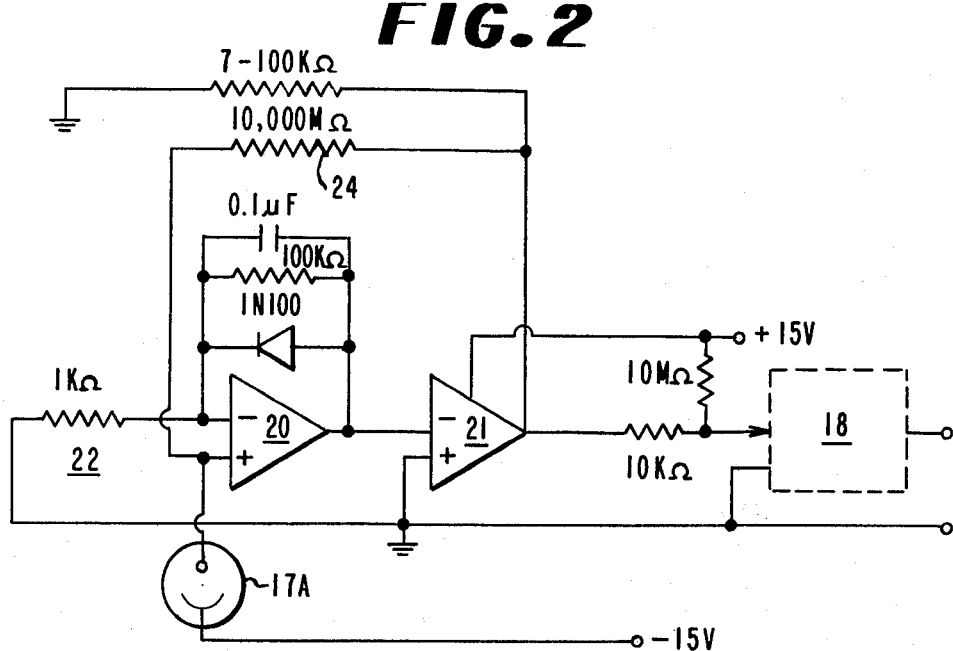
FIG. 2 is a schematic circuit diagram of an object photometer circuit.

FIG. 2 shows the circuit diagram for object photometer 17. The voltage/frequency converter 18 is connected to the photometer circuitry. The output signal of the object photometer is fed to the input of the voltage/frequency converter 18 which in turn is connected to the internal processor 9.

A two-stage current to voltage converter comprises operational amplifier 20, typically an AD515KH, and operational amplifier 21, typically a CA3140T. The inverting terminal of amplifier 20 is connected to circuit common via 1K ohm (kilo-ohm) resistor 22, whereas the noninverting terminal is connected to the anode of object photodetector 17A, typically an R645 vacuum photodiode manufactured by HAMAMATSU. The feedback circuit of op amp 20 comprises parallel connected 0.1 uF (microfarad) capacitor, 100K ohm resistor and an anti-latch diode, typically an IN100 type. The output terminal of op amp 20 is connected to the inverting terminal of op amp 21. A very high value current feedback resistor 24, typically $10^{10}$ ohms, joins the noninverting terminal of op amp 20 with the output of op amp 21 and is guarded by seven 100K ohm resistors placed coaxially about it to reduce response time (0.25 ms rise, 0.4 ms fall at 1/e). This particular configuration has been found to reduce the resistor shunt capacitance as well as the capacitance to ground.

Photodetector 17A is biased typically with $-15$ volts. The output of the first amplifier stage is maintained at virtual ground so as to keep the internal power dissipation constant and independent of detector current. In this manner, the temperature and, as a consequence, input bias current remain stable.

In operation, for frequencies larger than 15 Hz, low noise amplifier 20 amplifies with unity gain whereas op amp 21 provides the high loop gain. For frequencies less than 15 Hz, both amplifiers contribute to loop gain, with the precision of measurement limited only by the inherent noise characterisics of op amp 20.

The voltage-frequency converter 18 is a commercial element, typically an Analog Devices Model 460K and sends its pulse-like signal to gated counters in the internal processor 9 (FIG. 1).

Figure 3:
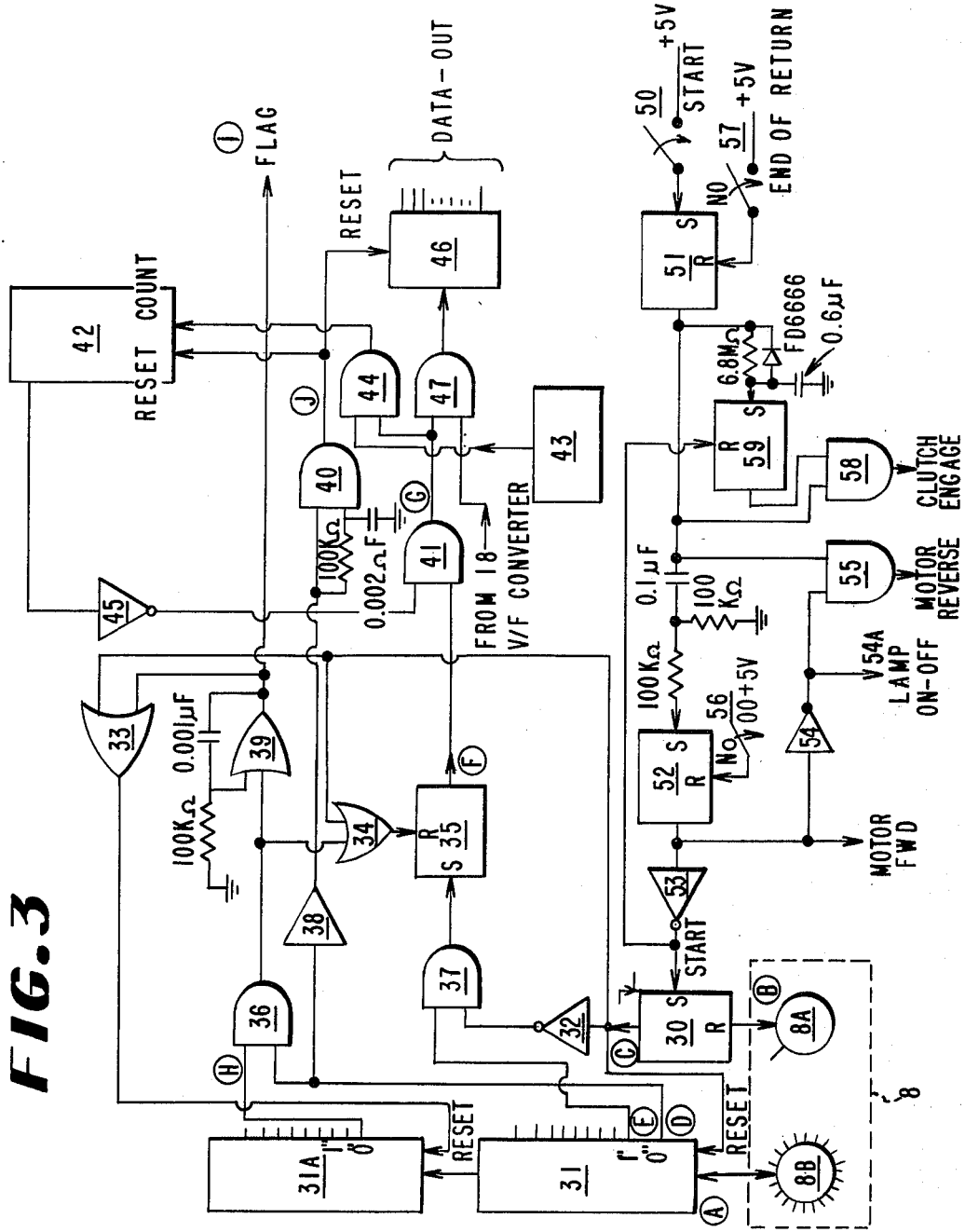
FIG. 3 is a schematic diagram of the data logic circuit.

Although a voltage-frequency converter is specified for this apparatus, with slight modification of the circuitry of internal processor 9, and in particular the data logic circuit of FIG. 3, other types of analog-digital (A/D) converters may be substituted.

FIG. 3 shows the data logic circuit which is a component of internal processor 9. The data logic circuit is designed to generate a sequence of 1-nm wide gating intervals during each continuous scan through the visible spectrum by wavelength drive 7 of monochromator 4. Thus the magnitude of the sensed intensity (in the form of a series of pulses output from V/F converter 18) can be recorded as a function of the scan position at any instant and transmitted to the computer in an appropriate form for processing.

Figure 4:
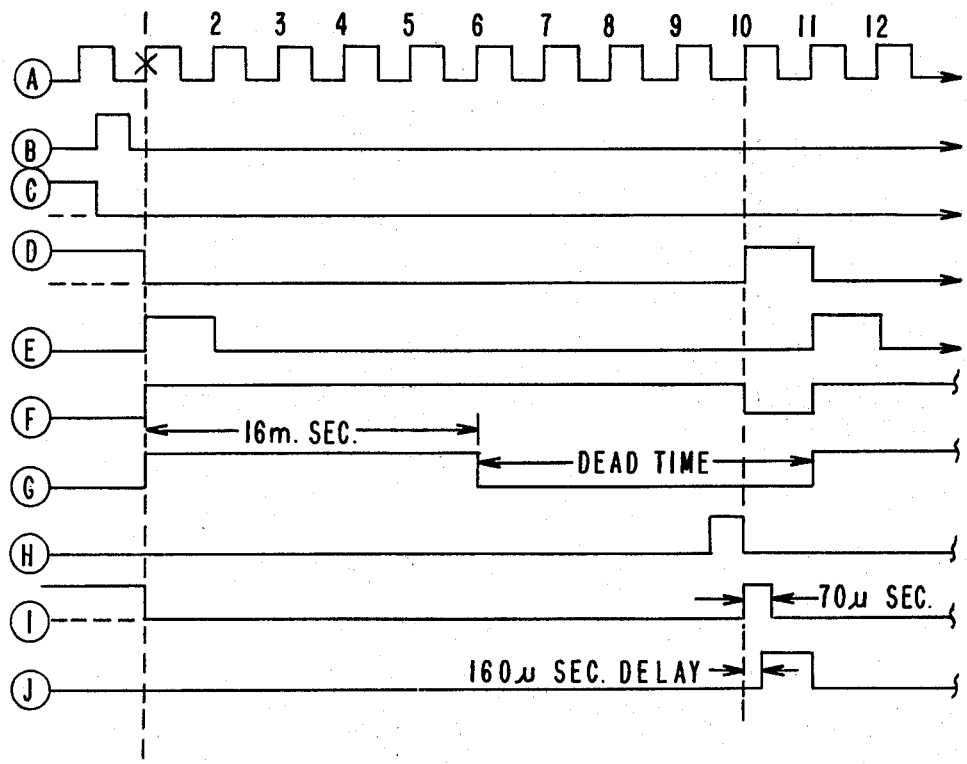
FIG. 4 is a timing diagram for the data logic circuit of FIG. 3.

The waveforms shown in FIG. 4 respresent the logic-level signals that are present at the corresponding encircled lettered-points in the circuit of FIG. 3 during each 16 m sec (milliseconds) timed interval.

Shaft encoder 8, connected directly to wavelength drive unit 7, consists of two transducers, 8A and 8B. The first, 8A, transmits one pulse per shaft revolution to latch 30, typically a CD4043AE NORlatch, Waveform B, whereas second transducer, 8B, transmits 1000 pulses per shaft revolution to digital counter 31, Waveform A. Each pulse repetition is approximately 3.3 msec, that corresponds to a scan increment of 0.1 nm.

Thus three revolutions of the shaft of the wavelength drive unit are needed to scan the complete spectrum. The output terminal of latch 30 terminates in common connection C with the RESET terminal of decade counter 31, the input terminal of inverter 32, an input terminal of OR gate 33 whose output terminal connects with the RESET terminal of decade counter 31A, and an input terminal of OR gate 34 whose output terminal connects with the RESET terminal of NORlatch 35. Decade counters 31 and 31A, typically type CA4017 manufactured by RCA, generate a logic high signal on only one counter data terminal at a time as the count progresses. Counter 31 is programmed to transfer count pulses to counter 31A upon each count of ten so that a count-of-nine signal will appear as a logic low signal at the "1" terminal of counter 31A. At the instant of the passage of the trailing edge of the count of nine pulse, a logic high signal appears at the "1" terminal of counter 31A and remains briefly until counter 31A reset upon the count of ten pulse, which appears as a logic high signal at the "0" terminal of counter 31, Waveform D. These signals are combined by AND gate 36 to generate a flag signal Waveform I to tell the computer to accept count data from counter 46 before this counter is reset by reset signal, Waveform J, 160 u sec later.

The output terminal of AND gate 36 is connected to OR gate 39, configured as a one-shot by the 0.001 uF capacitance and 100K ohm resistor, to generate a 70 u sec duration flag signal to computer 10, Waveform I. In addition, the output terminal of OR gate 39 is connected to the other input terminal of OR gate 33 whose output is applied to the RESET terminal of counter 31A. Simultaneously, the count-of-ten signal at the output terminal of AND gate 36 is applied to the RESET terminal of NORlatch 35, via the other terminal of OR gate 34. The SET terminal of NORlatch 35 is connected to the "1" terminal of counter 31 via AND gate 37 whose other input terminal connects with the output terminal of NORlatch 30 via inverter 32. The setting of NORlatch 35 takes place at the end of each count of ten and remains set until reset by the next ten-count, Waveform F. The output terminal of NORlatch 35 is connected to a first input terminal of AND gate 41 whose output, Waveform G, serves to control the clock signal input to 16 m sec timer 42 from a 1 MHz quartz crystal oscillator 43 via AND gate 44.

The timer 42 output terminal is connected to the second input terminal of AND gate 41 via inverter 45. In addition to providing a control signal for timer 42, Waveform G also controls the admission of pulses from V/F converter 18 to 16-bit counter 46 via a connection of the output terminal of AND gate 41 to one input terminal of AND gate 47.

Reset signals for 16 L m sec timer 42 and 16-bit counter 46, Waveform J, occur after each count of ten signal pulse, Waveform D, generated by counter 31 after these pulses have been delayed 160 u sec by the RC network associated with AND gate 40. Buffer 38, connecting the line joining counter 31 to AND gate 36 with AND gate 40 is used to prevent premature reset of counter 46, before counter 46 has completed transfer of its data to computer 10.

The monochromator scan is initiated by means of switch 50. This activates a scanning motor drive in the forward direction and sequentially sets NORlatches 51, 52, and 30, thus activating the output of transducer 8A. The output terminal of NORlatch 51 is also connected to the SET terminal of a NORlatch 59 via a delay network comprising a 6.8 M ohm resistor and 0.6 μF capacitor. Consequently, NORlatch 59 does not set until 3–4 seconds after switch 50 is closed. AND gate 58 joins the output signals of NORlatch 59 and NORlatch 51 to generate a clutch enable signal. This delay allows the lamp time to stabilize before the scan commences. The RESET terminal of NORlatch 59 is connected to the SET terminal of NORlatch 30 for immediate reset. A pulse network, formed by two 100K ohm resistors and a 0.1 uF capacitor, connects the output terminal of NORlatch 51 with the SET terminal of NORlatch 52, while inverter 53 connects the output terminal of NORlatch 52 with the SET terminal of NORlatch 30. An inverter 54 connects the output terminal of NORlatch 52 with one input terminal of AND gate 55, whereas the other input terminal of AND gate 55 is connected to the output terminal of NORlatch 51. A normally open end of scan switch 56 is mechanically actuated by the scan drive at the end of each scan through 300 nm to reset NORlatch 52. Similarly, normally open end of return switch 57 is momentarily closed at the end of the scan drive "rewind" period to reset NORlatch 51.

In operation, the scan sequence starts when pushbutton switch 50 is closed to set NORlatch 51, and simultaneously to set NORlatch 52 to energize the motor in the forward direction and turn on the lamp. Three to four seconds later, NORlatch 59 operates to engage the motor clutch. Latch 59 is then immediately reset when the output of latch 52 goes low at start-up. At this time the set signal is also removed from NORlatch 30 to ready it for a start pulse from the transducer 8A. Upon occurrence of the start pulse, Waveform B, counters 31 and 31A start counting pulses from transducer 8B, Waveform A, since these counters and NORlatch 35 had already been reset, Waveform C. The first count at the "1" terminal of counter 31 enables AND gates 41, 44 and 47 to activate timer 42 to accurately measure a 16 m sec. duration. During this interval, the serial input data from V/F converter 18 is recorded by counter 46 which in turn converts the data to parallel format for input to computer 10. Once the 16 m sec. time interval expires, Waveform G, the data from V/F converter 18 is terminated by gate 47 and awaits the occurrence of the count-of-ten pulse.

When the count-of-ten pulse occurs, Waveform D, counter 31A and timer 42 are reset. The count of ten signal also initiates the data transfer flag to tell computer 10 to accept count data from counter 46. Within 160 u sec (microseconds) of this transfer, counter 46 and NORlatch 35 are reset again to prevent counter 46 from incrementing before data transfer is complete. The next transducer 8B pulse initiates a new cycle. In this way intensity data from V/F converter 18 is obtained consistently and repetitively every 10 pulses (1 nm increment) from transducer 8B until an end of scan reset occurs.

When the end of scan switch 56 closes, the scan direction reverses and the lamp is turned off, but since the signal at the SET terminal of NORlatch 30 becomes high, Waveform C at the output terminal of NORlatch 30 stays high even though tachometer 8A start pulses are still generated during scan return. Consequently, all counters are deactivated and no data is recorded or transferred to computer 10 during the period "end of scan" to "end of return."

Upon return of the monochromator drive unit to approximately 380 nm, the end of return switch 57 closes and the output of NORlatch 51 becomes low. This removes power to motor reverse and prepares the drive unit for the next forward scan when push-button 50 is again depressed.

To accommodate the signal produced by a nonintegrating type A/D converter, should this element be used in place of voltage/frequency converter 18, oscillator 43, AND gate 44, timer 42, AND gate 41 and inverter 45 are no longer necessary.

Figure 5:
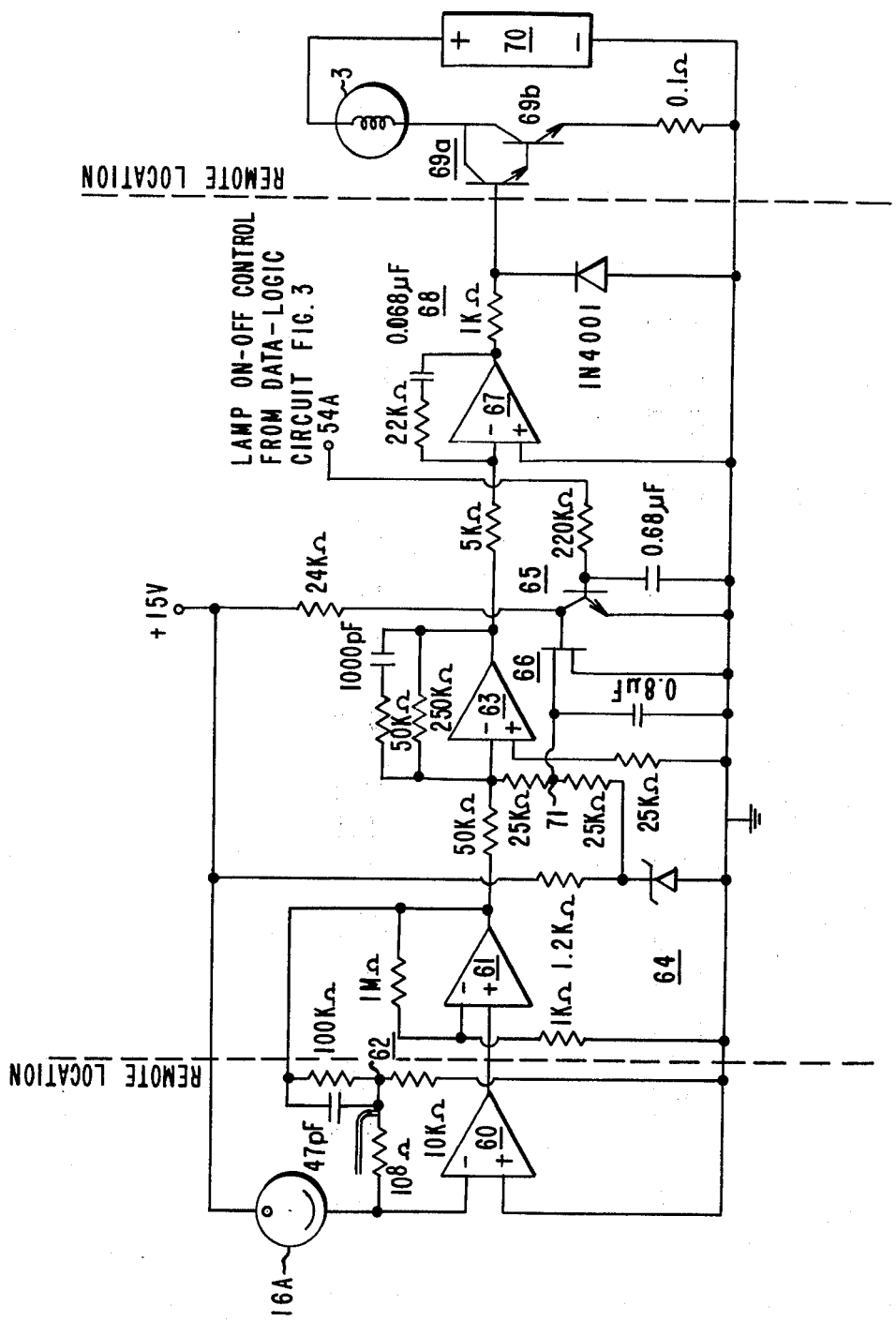
FIG. 5 is a schematic diagram of the lamp control circuit.

FIG. 5 is the schematic diagram of the lamp control circuit. This circuit develops the feedback control voltages needed to adjust lamp intensity such that the reference photometer output signal level is maintained constant throughout each scan of the monochromator.

High speed photometer response is required for both object and reference photometers to enable accurate tracking of system variations. Typical system variations, inclusive of electrical component noise, that are tracked by this instrument have frequencies which range from DC-50 kHz. Throughout this range of frequencies careful attention must be applied to circuit design to minimize phase shifts associated with high-gain operations at the lower frequencies. Ordinarily, loop phase shifts of 90° at frequencies greater than 2 Hz might be expected from the lamp. Such high-gain amplification, and additional phase shifts summing to 180° at loop gains in excess of unity would cause undesirable fluctuations in DC lamp voltage and uncontrolled oscillations in the extreme.

In this invention, the reference photometer 16A is a fast response (10-20 μsec.) vacuum photodiode typically an HAMAMATSU 642 positioned in the radiated light beam reflected from mirror 15 (FIG. 1). The anode of photometer 16A is connected to a +15 V supply and its cathode is connected to the inverting terminal of op amp 60, typically a type AD515, which has its noninverting terminal connected to ground. Op amp 60, comprising the first of a two-stage high gain current-to-voltage converter, is serially connected to the noninverting terminal of op amp 61, typically a type 741, to provide a low impedance input for photometer 16A and shunt feedback to obtain both low-noise amplification and power dissipation stabilization. The inverting terminal of op amp 61 is connected to circuit common via a 1K ohm resistor while the 1 M ohm feedback resistor connected between the inverting and output terminals of op amp 61 provides a gain of 1000, thus forcing the output of op amp 60 to operate within 0.1 V of ground to stabilize power dissipation and consequently its input bias current. A $10^8$ ohm resistor in combination with a 47 pF capacitor and 100K ohm resistor connects the inverting terminal of op amp 60 with the output terminal of op amp 61 to provide attenuation for the current feedback. A tuning stud across the $10^8$ ohm resistor is adjusted to add capacitance to prevent circuit oscillation. A 10K ohm resistor connects the junction 62 with circuit common.

Op amp 63 is configured as a voltage summing amplifier to compare the output of feedback detector 61 with the voltage reference furnished by Zener diode 64 through a 50K ohm voltage divider to the summing junction at the inverting terminal of op amp 63. A 1.2K ohm resistor serves to drop the voltage from the +15 V source to Zener diode 64, and a 25K ohm resistor is selected to compensate for input offset current variations. In addition, op amp 63 is selected such that its inherent offset voltage is in the right direction and magnitude to turn the lamp off when the junction 71 is at ground potential.

Lamp turn-off control is easily provided by applying a voltage at terminal 54A. This causes transistor 65, typically a type 2N3906, to conduct and close FET switch 66, typically a CA4016 which in turn pulls junction 71 low. The 0.08 uF capacitor connected between ground and one terminal of FET 66 serves to limit current surges when the lamp is initially off. For a similar purpose, the 0.68 uF capacitor connects the base of transistor 65 to ground.

The feedback circuit fo amplifier 63 includes a 250K ohm resistor in parallel with a series connected 50K ohm resistor and 1000 pF capacitor. This latter element is used to reduce loop gain at the higher frequencies and prevent oscillation.

The output terminal of op amp 63 is connected serially to the inverting terminal of a high gain amplifier 67 via a 5K ohm input resistor. High loop gain at low frequencies for accurate lamp intensity control is assured by means of the 22K ohm and 0.068 uF capacitor 68 in series connection which form the feedback path.

A 1K ohm resistor connects the output of op amp 67 to the base of the first of a serially connected pair of 2N3055 power transistors 69A, 69B to control the lamp source, while a IN4001 diode, connects the base of transistor 69A to ground, to protect the first 2N3055 from reverse bias.

A 24 V switching power supply 70 is used to power lamp 3. This unit is typically an RMK 24-B manufactured by KEPCO Corporation.

Lamp 3 is a 24 V Type FCS 150 watt tungsten filament bulb manufactured by General Electric. Other lamps may be used, but these should radiate relatively broad band spectral emissions.

Power supply 70 drives lamp 3 via a 0.1 ohm load resistor and power control transistors 69A and 69B.

The spectrophotometer is useful for measuring colors of coatings on substrates such as steel, plastics reinforced with fiberglass, plastics such as polyethylene or polypropylene or wood colored plastic substrates or almost any other colored surface. The color of a wet paint can be measured by pumping the paint into a glass covered cell as shown in McKinney and Reilly U.S. Pat. No. 3,020,795 issued Feb. 13, 1962. The computer attached to the spectrophotometer calculates tristimulus color values which then can be compared with tristimulus color values for standard colors.

Although the disclosure has been limited to application in the visible light spectrum, its utility can be extended into the infrared and ultraviolet wavelength bands as well, provided the lamp source has a useable level of radiation in these bands.

We claim:

1. In a spectrophotometer having a light source, a scanning type monochromator having an entrance slit and an exit slit for a light beam from the light source and containing a light dispersing or selection element and a wavelength drive mechanism to provide light beams of different wavelengths over a light spectrum constantly being scanned, beam-shaping optics at the exit slit of said monochromator and an object photometer for measuring the intensity of reflected or transmitted light from an object being tested and generating an electrical signal proportional to the intensity of the light measured and electrically connected to means for recording said electrical signal as a function of wavelength measured, the improvement used therewith comprising:
   (a) a beam splitter, positioned between said beam-shaping optics and said object, for dividing the beam exiting from the monochromator into first and second light beams, whereby the first beam is incident upon the object;
   (b) a reference photometer measuring the flux of the second light beam and generating an output electrical signal proportional to the intensity of the light measured; and
   (c) a light source control, connecting said reference photometer with said light source, which receives the electrical signal from the reference photometer and generates a feedback electrical signal to adjust the intensity of the light source by means of a proportional/integral controller to maintain the reference photometer output electrical signal level constant across the light spectrum being scanned.

2. The spectrophotometer of claim 1 in which the electrical signal from the object photometer and reference photometer are separately amplified by two-stage amplifiers in which the voltage level at the output of the first stage is at virtual ground.

3. The spectrophotometer of claim 1 in which the object photometer and the reference photometer have similar spectral response characteristics.

4. The spectrophotometer of claim 1 in which the recording means comprise a voltage to frequency converter and said converter is electrically connected to an internal processor which is connected to a computer to provide a readout in standard color values.

5. The spectrophotometer of claim 4 in which the monochromator is a double-grating type monochromator being continuously driven and wherein measurements are taken at different wavelengths selected by the internal processor.

6. The spectrophotometer of claim 2 in which the feedback resistance of the two-stage amplifier for the object photometer is electrically guarded.

7. The spectrophotometer of claim 3 in which the object photometer and reference photometer comprise vacuum diodes.

8. The spectrophotometer of claim 1 in which the object photometer signal is measured at wavelength intervals provided by the shaft encoder.

9. The spectrophotometer of claim 1 in which the recording means comprises an A/D converter.

10. The spectrophotometer of claim 1 in which the recording means comprises a voltage to frequency converter electrically connected to a microprocessor which provides a readout in standard color values.

* * * * *